Patented Dec. 18, 1923.

1,478,061

UNITED STATES PATENT OFFICE.

DONALD G. ROGERS AND HAROLD T. STOWELL, OF BUFFALO, NEW YORK, ASSIGNORS TO NATIONAL ANILINE & CHEMICAL COMPANY, INC., OF NEW YORK, N. Y., A CORPORATION OF NEW YORK.

VAT DYE.

No Drawing.     Application filed April 11, 1922.   Serial No. 551,643.

*To all whom it may concern:*

Be it known that we, DONALD G. ROGERS and HAROLD T. STOWELL, citizens of the United States, residing at Buffalo, in the county of Erie and State of New York, have invented certain new and useful Improvements in Vat Dyes; and we do hereby declare the following to be a full, clear, and exact description of the invention, such as will enable others skilled in the art to which it appertains to make and use the same.

This invention relates to an improved method for the manufacture of the dyestuff known chemically as flavanthrone (also called flavanthrene) and commercially as indanthrene yellow G. The invention includes improvements in the purification of said dye as well as a new intermediate product.

In the production of the dyestuff above mentioned it has been proposed to heat beta-aminoanthraquinone with antimony pentachloride to boiling in nitrobenzene solution, with isolation of the dye formed by cooling and filtration of the cooled melt. This method of production and isolation, however, has the objection that the dye obtained is more or less impure and duller and greener than is desirable. The dyestuff produced in this way can be purified by extracting the isolated dye with hot nitrobenzene, in which the dye itself is substantially insoluble, or the reaction mass itself can be filtered at or near the boiling temperature; but the use of nitrobenzene at or near the boiling temperature creates a serious fire and health hazard, since nitrobenzene vapor is highly inflammable and also highly poisonous.

The improved process of the present invention overcomes or avoids the objections above mentioned and involves the use of a lower temperature of reaction such that the process can be carried out without heating to a temperature above 150° C., which temperature can easily be attained by the use of steam at pressures commonly available in factory practice. The improved process moreover is one in which the filtrations can be carried out at ordinary temperatures, as distinguished from filtrations at or near the boiling point of nitrobenzene, while the yield and quality of the dyestuff thus obtained is entirely comparable with that obtained with the use of boiling nitrobenzene.

We have discovered that when beta-aminoanthraquinone and antimony pentachloride are mixed in nitrobenzene solution, a salt of beta-aminoanthraquinone and antimony pentachloride is formed, which salt in the presence of antimony pentachloride and nitrobenzene can be readily converted to a salt of flavanthrone with antimony pentachloride upon heating at temperatures of 50° C.–160° C. If the mixture is heated at temperatures higher than about 160° C., the flavanthrone antimony pentachloride salt breaks up, giving flavanthrone (which appears to be more or less chlorinated), antimony trichloride and hydrochloric acid.

In the carrying out of the new process, the product first isolated is the flavanthrone antimony pentachloride salt which we consider to be a new product. This new flavanthrone antimony pentachloride salt is quite stable and may be readily isolated and preserved out of contact with moist air. It is fairly soluble in warm nitrobenzene and crystallizes out again on cooling. Advantage is taken of this property in purifying the crude product from a small amount of blue dye which is formed simultaneously. This new flavanthrone antimony pentachloride salt may also be prepared from flavanthrone and antimony pentachloride in a nitrobenzene solution as well as directly from the beta-aminoanthraquinone in the manner above described. An impure flavanthrone may thus be purified by converting it into its antimony pentachloride salt and recrystallizing it from nitrobenzene, for example, in the manner described below in conjunction with the salt produced according to the specific example.

The invention will be further illustrated by the following specific example, but it is understood that the invention is not limited thereto. The parts are by weight.

100 parts of beta-aminoanthraquinone (100% basis) in a finely powdered condition are well suspended at room temperature in 1200 parts of nitrobenzene, and 350 parts of antimony pentachloride are added slowly with vigorous agitation, the temperature rising of itself to 60°–75° C. The charge is then rapidly heated during a period of about 10 to 20 minutes to 145°–150° C. and is held there for about 45 minutes. It is then cooled to 35° C. with agitation, over a period of about 1–2 hours, and the resulting mixture is then filtered. The treatment thus described results in the production of the flavanthrone antimony pentachloride salt which is filtered out in a crude state. The mother liquor is further cooled and crystallized to give a green dye, containing both flavanthrone and a blue dye, which may be subsequently purified.

The crude product, that is, the flavanthrone antimony pentachloride salt, after it has been isolated by filtration, is then stirred into 1000 parts of fresh nitrobenzene and heated to about 100° C., then cooled to about 20° C. and filtered, and the residue then washed with 200 parts of nitrobenzene and sucked or blown as dry as possible. The filtrates thus obtained can be used for the next dye formation batch. The treatment of the crude product in the manner thus described results in its purification, so that the product produced by the last filtration is the purified flavanthrone antimony pentachloride salt. This purified salt is then decomposed or hydrolyzed and converted into the flavanthrone dye by dissolving it at room temperature, or above, in about 300 parts of sulfuric acid at 66° Bé., and pouring the solution into 3000 parts of water with vigorous agitation. The precipitated dye is filtered out and washed acid-free with warm water, this treatment giving the dye in the form of a finely divided smooth uniform paste suitable for use.

Instead of treating and decomposing the purified flavanthrone antimony pentachloride salt with sulfuric acid, it can be treated by boiling it with dilute hydrochloric acid (one volume of concentrated hydrochloric acid to one volume of water) and the resulting product then filtered and washed free from acid with hot water and dried at 100° C. to give a product in the form of a powder or of soft lumps that will readily pass a 100 mesh sieve, and the product can be thus obtained in the form of a powder when desired instead of a paste. Other acids, for example, tartaric acid may also be used to effect the conversion; or it may be brought about by boiling with nitrobenzene alone.

The carrying out of the process at lower temperatures has many advantages over the process carried out at the boiling point of nitrobenzene (210° C.). The use of a lower reaction temperature is within the reach of plant steam pressure while the filtrations can be carried out at ordinary temperatures, thus avoiding the use of boiling nitrobenzene and the filtering of the solution at or near the boiling point. Moreover, the use of a lower temperature results, not in the direct production of the flavanthrone, but in the production of the intermediate reaction product, namely, flavanthrone antimony pentachloride salt, which is formed at a temperature ranging from about 50° to about 150° C. This addition product of flavanthrone with antimony pentachloride can be purified from impurities, particularly from a small amount of a blue dye and also of a dull material. In the purification, advantage is taken of the much greater solubility in nitrobenzene of the antimony pentachloride compounds of the impurities over that of the antimony pentachloride compound of the flavanthrone dye. The crude material is therefore re-crystallized from the nitrobenzene which can be then used in the succeeding batch.

The nitrobenzene used in the process can be for the most part recovered for reuse by steam distillation or other appropriate methods.

It is understood that the details in this process can be varied considerably without departing from the spirit or scope of the invention. For example, the proportions of nitrobenzene can be varied, a suitable proportion being about three times the amount necessary to form the nitrobenzene antimony pentachloride compound,

$$3C_6H_5NO_2.2SbCl_5.$$

Further, the temperature conditions, the time of heating and cooling, etc., or the manner or order of admixing the ingredients can be varied.

The new intermediate product, namely, the flavanthrone antimony pentachloride salt, apparently contains two molecules of antimony pentachloride combined with one molecule of flavanthrone. The product after purification is obtained in the form of orange colored plates or cubes with a green reflex. When wet with nitrobenzene the crystals appear to be almost entirely green. The new intermediate product is itself capable of dyeing cotton yellow shades from a hydrosulfite vat.

It will thus be seen that the present invention provides an improved process for the manufacture of the yellow flavanthrone dye with avoidance of elevated temperatures around the boiling point of nitrobenzene and with the intermediate production of a new intermediate product which can be isolated and which has a property adapting it to be readily purified from accompanying impurities, and that advantage is taken of the properties of the new intermediate product in carrying out the purification at an intermediate stage so that the final dye, when obtained, is obtained directly in a purified form. The new process possesses marked advantages from an engineering and operating point of view.

We claim:

1. The improvement in the manufacture of flavanthrone which comprises heating beta-aminoanthraquinone with antimony pentachloride in the presence of nitrobenzene to a temperature not exceeding about 160° C., thereby producing a compound of flavanthrone with antimony pentachloride.

2. The improvement in the manufacture of flavanthrone which comprises heating beta-aminoanthraquinone with antimony pentachloride in the presence of nitrobenzene to a temperature not exceeding about 160° C., thereby producing a compound of flavanthrone with antimony pentachloride, cooling the resulting mixture to about 35° C. and filtering the said compound from soluble impurities.

3. The improvement in the manufacture of flavanthrone which comprises heating beta-aminoanthraquinone with antimony pentachloride in the presence of nitrobenzene to a temperature not exceeding about 160° C., thereby producing a componnd of the flavanthrone with antimony pentachloride, cooling the resulting mixture to about 35° C., filtering the said compound from soluble impurities, purifying the compound by re-crystallization from nitrobenzene and converting the compound into the flavanthrone by treatment with acid.

4. The improvement in the manufacture of flavanthrone which comprises mixing beta-aminoanthraquinone with antimony pentachloride in the presence of nitrobenzene at a temperature of below about 60-75° C., then heating the mixture to a temperature of about 145-150° C. for a period of about 45 minutes, thereby producing a compound of the flavanthrone with antimony pentachloride, then cooling to about 35° C. with agitation, and filtering the said compound from the resulting mixture.

5. The further improvement in the process of the preceding claim 4 which comprises further purifying the crude product, obtained by filtration, by heating it with nitrobenzene to about 100° C., then cooling to about 20° C., and filtering.

6. The improvement in the manufacture of flavanthrone which comprises suspending about 100 parts of beta-aminoanthraquinone in about 1200 parts of nitrobenzene and gradually adding about 350 parts of antimony pentachloride with vigorous agitation, heating the resulting mixture to a temperature of about 145-150° C. for a period of about 45 minutes, thereby producing a compound of the flavanthrone with antimony pentachloride, then cooling to about 35° C. and filtering, and purifying the crude product thus obtained by heating to about 100° C. with about 1000 parts of nitrobenzene, cooling and filtering.

7. The improvement in the manufacture of flavanthrone which comprises heating the antimony pentachloride salt of beta-aminoanthraquinone in the presence of nitrobenzene and antimony pentachloride to a temperature of about 145-150° C., whereby such salt is converted into the antimony pentachloride compound of flavanthrone.

8. The improvement in the manufacture of flavanthrone which comprises purifying the antimony pentachloride salt of flavanthrone by re-crystallization from nitrobenzene.

9. The improvement in the manufacture of flavanthrone which comprises heating the antimony pentachloride salt of flavanthrone with an acid to decompose the salt and set free the flavanthrone.

10. The improvement in the manufacture of flavanthrone which comprises dissolving the antimony pentachloride salt of flavanthrone in concentrated sulfuric acid and treating the resulting solution with water, thereby setting free the flavanthrone dye.

11. The improvement in the manufacture of flavanthrone, which comprises dissolving the antimony pentachloride compound of flavanthrone in sulfuric acid and adding the solution to water, thereby producing the flavanthrone in a finely divided condition.

12. As a new product, a salt of antimony pentachloride with flavanthrone, said salt being soluble in warm nitrobenzene and crystallizing out therefrom on cooling.

In testimony whereof we affix our signatures.

DONALD G. ROGERS.
HAROLD T. STOWELL.